July 11, 1939.　　　F. HOLMES ET AL　　　2,166,054
LINE-RETRIEVING APPARATUS
Filed Nov. 25, 1938　　　3 Sheets-Sheet 1

July 11, 1939.  F. HOLMES ET AL  2,166,054
LINE-RETRIEVING APPARATUS
Filed Nov. 25, 1938   3 Sheets-Sheet 2

Foster Holmes,
Victor G. Klein,
Inventors.
Haynes, Koenig and Wolf,
Attorneys.

July 11, 1939.  F. HOLMES ET AL  2,166,054
LINE-RETRIEVING APPARATUS
Filed Nov. 25, 1938  3 Sheets—Sheet 3

Foster Holmes,
Victor G. Klein,
Inventors.
Haynes, Koenig and Wolf
Attorneys.

Patented July 11, 1939

2,166,054

UNITED STATES PATENT OFFICE 2,166,054

LINE-RETRIEVING APPARATUS

Foster Holmes, Normandy, and Victor G. Klein, St. Louis, Mo., assignors to Lincoln Engineering Company, St. Louis, Mo., a corporation of Missouri Application November 25, 1938, Serial No. 242,236

3 Claims. (Cl. 242—86)

This invention relates to line retrieving apparatus, and with regard to certain more specific features, to retrieving reels.

Among the several objects of the invention may be noted the provision of a simple but effective retrieving reel in which the retrieving force is obtained by gravity and wherein a mechanical advantage is obtained upon manual extension of the line to be withdrawn; the provision of a reel of the class described which is of compact form and which may be located for withdrawal of the reeled line in any direction, the same being adapted for mounting underground, upon the ground and overhead; and the provision of a device of the class which is springless and without close-fitting bearings at any vital point. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated two of various possible embodiments of the invention, Fig. 1 is a side elevation of one form of the invention showing a hose in reeled position;

Fig. 4 is an enlarged vertical section taken on line 4—4 of Fig. 1;

Fig. 5 is a horizontal section taken on line 5—5 of Fig. 4;

Fig. 6 is a vertical section taken on line 6—6 of Fig. 5;

Similar reference characters indicate corresponding parts throughout the several views of the drawings.

Figure 1:
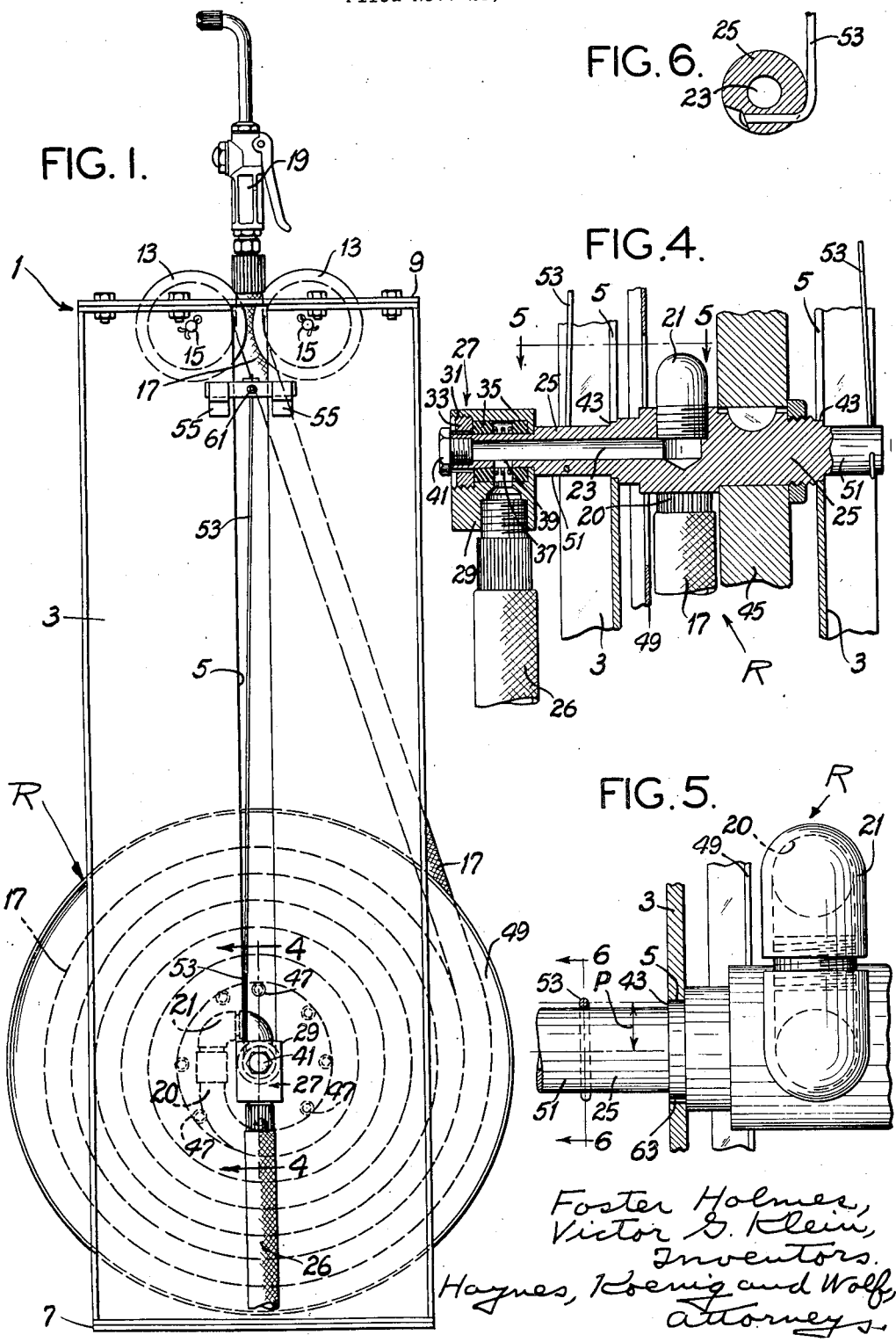

Referring now more particularly to Fig. 1, there is shown in general at numeral 1 a frame consisting of oppositely spaced side plates 3, each of which is vertically slotted as indicated at 5. The side plates are joined at the bottom by a plate 7 and at the top by a header plate 9. In the header plate 9 is an opening 11 accommodating spaced guide pulleys 13. The pulleys 13 are supported upon bearing pins 15 carried between the side plates 3. The spacing of the pulleys 13 is such as to accommodate the line to be reeled (see Fig. 1).

In the present example, the article to be reeled is a pressure lubricating hose 17. Other hoses such as air hoses may be reeled by apparatus such as disclosed herein; or flexible rope, wire, cable, chains and the like.

Referring again to the present example, the lubricator hose 17 carries at its end a control valve 19 which functions as a stop, with respect to the pulleys 13, to prevent further reeling in of the hose.

From the valve 19 the hose 17 is carried downward and wrapped spirally and inwardly upon a reel, indicated generally at R. The inner end of the hose 17 is attached to a double elbow 21 having a passage 20 which communicates with an opening 23 passing through an axle 25 (see also Figs. 4 and 5). Lubricant from a source of pressure is brought through a flexible line 26 and led into the hollow portion 23 through a swivel packing gland 27. This gland consists of a manifold 29 in which is an opening 31 closed by a screw cap 33. Within the opening 31 are endwise packing pieces 35 which are pushed into their packing positions by a spring 37. The outer end of the passage 23 is closed by means of a screw cap 41.

Lubricant enters from the line 26 between the packing pieces 35 and flows through an opening 39 into the passage 23. By means of this swivel construction 27 the entire axle 25 may freely rotate with respect to the manifold 29. The hose 26 being flexible flexes to accommodate the up-and-down movement which will later be described as being required of the axle 25.

The axle 25 has shoulders 43 which are located respectively in the slots 5 of the frame, and roll up and down respectively in the slots. Between the shoulders 43 and fastened to the axle is a weight or flywheel 45. Upon the wheel 45 are located spacing pillars or studs 47 for supporting a guide plate 49. The wheel 45 and the guide plate 49 are so spaced that they will accommodate the hose to be reeled as a plane spiral and will also accommodate the guide pulleys 13 therebetween when the reel R is at maximum elevation. One advantage of reeling in a plane spiral, as distinguished from reeling in cylindrical helices, is the compactness of the structure attained; that is, the distance between the parts 45 and 49 and hence between supports 5 may be substantially reduced. Certain functional advantages also accrue which will be mentioned hereinafter. As shown in Fig. 1, the pillars 47 are so arranged that proper spiral support is given to the first loop of the hose to be reeled.

Beyond the slots 5 through which the axle 25 extends are formed drum portions 51. Fastened to the drum portions 51 in the manner indicated in Fig. 6 are flexible wire cables 53 which form supports for the axle 25 and extend upwardly to be in turn supported at brackets 55. The actual support is accomplished by providing split collets 57 which, by means of collars thereon, are supported in holes in the blocks 59. The blocks are removably carried in the brackets 55. Set screws 61 serve to close the split collets around the wire cable 53 so as tightly to hold them to the blocks 59. These adjustable supports serve to provide means for equally tensioning the two steel wires 53.

As indicated in Fig. 5, the distance P from the center line of the drum 51 to the center of the wire 53 is preferably substantially equal to the distance from the center line of the drum 51 to the edge of the respective slot 5 upon which the shoulder 43 is to roll. This provides for substantial rolling contact between the shoulder 43 and its respective groove 5. Clearance 63 (Fig. 5) prevents sliding contact on the opposite side of the slot 5.

Figure 2:
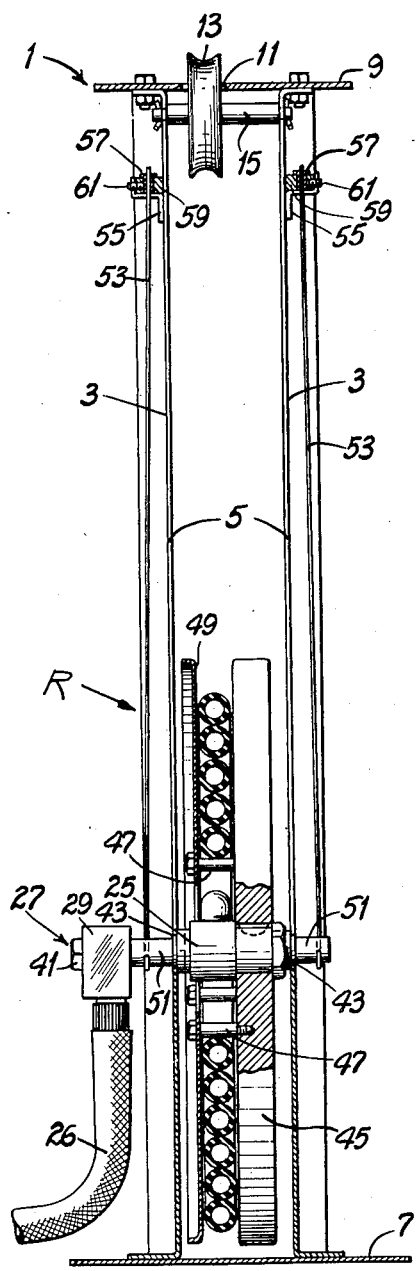
Fig. 2 is an end elevation, viewed from the right of Fig. 1, parts being broken away.
Figure 3:
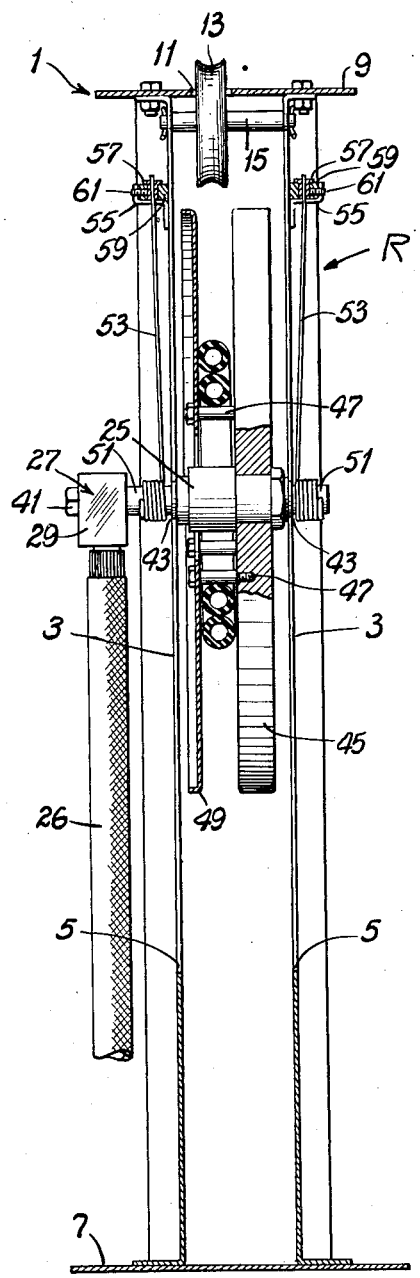
Fig. 3 is a view similar to Fig. 2, showing an alternative elevated position of parts.

Operation is as follows:

The operator grasps the valve 19 and withdraws the hose which pays out from between the pulleys 13. This causes the hose to unreel from its position between the flywheel 45 and the plate 49, thereby also causing rotation of the reel R. This rotation causes the drums 51 to roll up upon the wires 53, the wires winding upon the drums as the drums climb the wires. This results in lifting the weight of the parts carried upon the axle 25 as they rise from the position shown in Fig. 2 to the position shown in Fig. 3.

It will be observed that when withdrawal of the hose is first started the operator's pull exerts its maximum mechanical advantage against the rotary inertia of the flywheel 45, as well as toward lifting the weight of it and the associated parts. As lifting of the flywheel proceeds, this mechanical advantage becomes less by reason of the plane spiral characteristic of the wrapping of the hose on the reel. However, by this time, the momentum of the flywheel, which was originally obtained under the best conditions of mechanical advantage, aids in continuing the unreeling and lifting functions; and the operator in pulling out the hose needs thereafter apply only enough force to overcome friction.

After the operation of ejecting lubricant has been completed, the operator either simply lets go of the valve 19 or reduces the pulling force upon it, whereupon the weight of the reel R causes the drums 51 to unwind down along the wires 53, unreeling the wires 53 at it goes and reeling back the hose. The travel is from the position of Fig. 3 to the position of Fig. 2.

Since the width and positions of the pulleys 13 are such that they fit in between the flywheel 45 and plate 49, space is conserved, for at the time that the hose is unreeled, these pulleys 13 are accommodated between the empty and elevated flywheel and the plate.

As shown in Fig. 5, the hose unreels from one side of the reel R and the shoulders 43 are therefore normally continuously forced against the opposite sides of the slots 5. Thus the clearance 63 always exists and avoids sliding wear on the shoulders 43. It will be remembered that on the other sides of the slots 5 the shoulders 43 have rolling contact.

As the axle 25 moves up and down the hose 26 moves up and down and it is flexible enough and has enough slack therein to accommodate the required vertical motion of the swivel 27 to which the hose 26 is attached.

No rotary bearings requiring any substantial lubrication are used for supporting the axle 25. All contact with the supporting wires 53 is rolling contact as the wires wind onto and from the drums 51.

Figure 7:
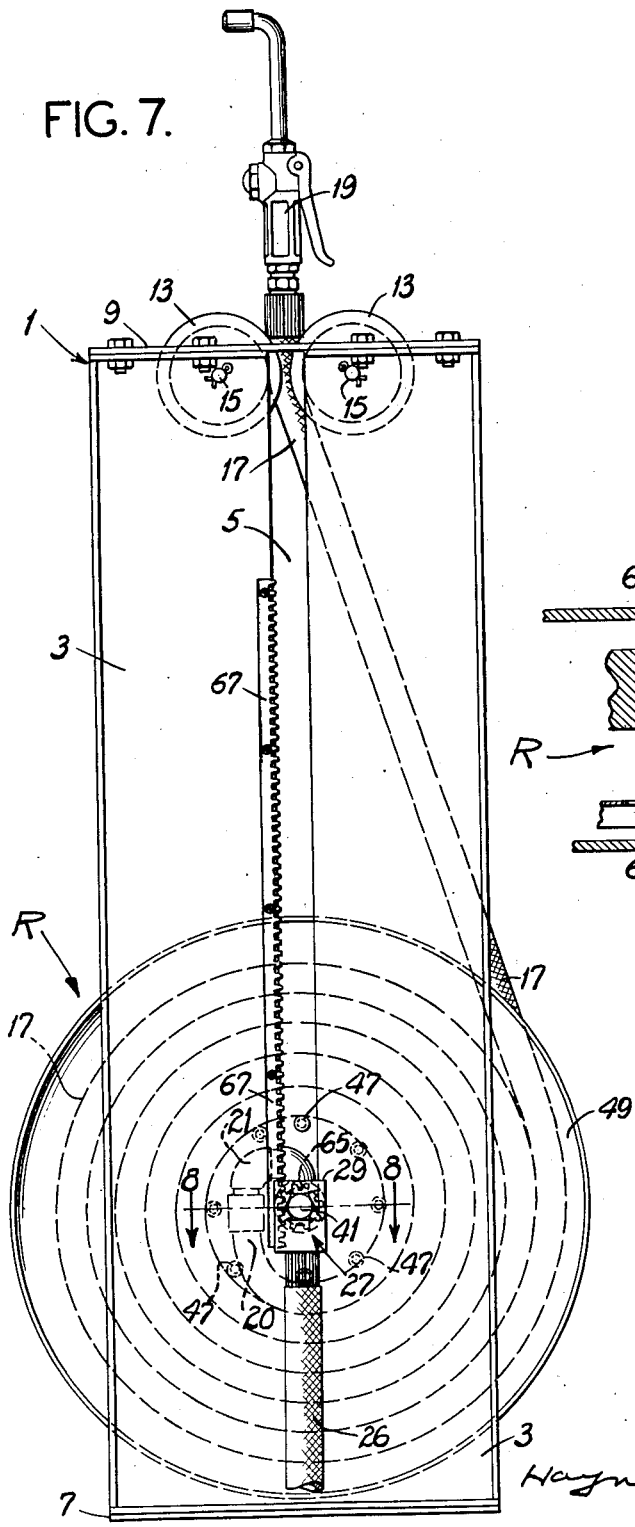
Fig. 7 is a view similar to Fig. 1 showing another embodiment of the invention; and, Fig. 8 is an enlarged horizontal section taken on line 8—8 of Fig. 7.
Figure 8:
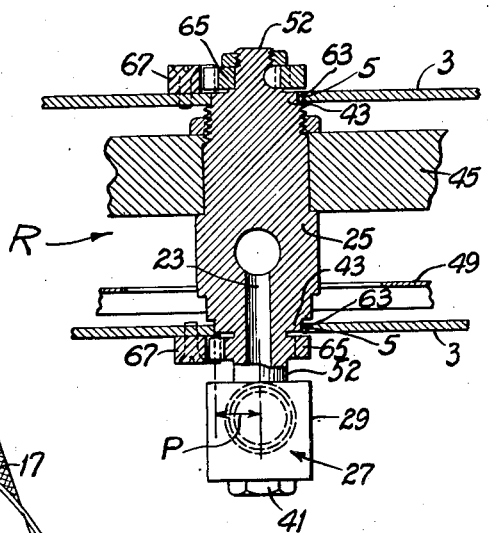

Referring now more particularly to Figs. 7 and 8, like numerals designate like parts. In this form of the invention a rack-and-pinion construction is substituted for the wire cables 53. In this case the drums 51 have no function and are therefore not likewise lettered in Fig. 8. The equivalent parts simply comprise extensions 52 (in Fig. 8) to which are attached gear pinions 65 which mesh with racks 67. The racks 67 are fastened to the support 3 adjacent the grooves or slots 5. The arrangement is such that the distance P in Fig. 8, which measures the pitch radii of the pinions 65, is equal to the distance from the center line of the pinion to the rolling surface of the slot 5. It is desirable here, as in the other form of the invention, that the shoulders 43 roll in the grooves or slots 5. Thus the pitch lines of the racks 67 are made tangent to the pitch circles of the pinions having radii P. The result is not only that the shoulders 43 roll on the proper side of the slot 5, but that the pitch circles of the pinions 65 are maintained in geometric rolling relationship with respect to the pitch lines of the racks 67. Thus, the proper operating conditions for the gears are maintained.

The operation of the form of the invention shown in Figs. 7 and 8 is similar to that described in connection with the other figures, except that the pinions 65 roll up along the racks 67 during the lifting operation as the hose is withdrawn (instead of drums 51 rolling up upon the wires 53).

The device will operate regardless of whether the line 17 is pulled upwardly, laterally, or laterally and downwardly, for in any event, the hose is first directed from the reel portions upwardly and through the pulleys 13 so that the lifting action of weight 45 and associated parts against gravity is preserved. The device does not need to stand absolutely vertical, but it is preferred that if it be sloped the weight of the parts associated with the axle 25 be such as to cause the shoulders 43 to rest against the proper surfaces in the slots 5. that is, the surfaces which have been adapted for the above-described rolling conditions. In this connection, it may also be seen that the slots 5 may be arranged angularly in the side members 3.

It is desirable, at about the time that the valve 19 functions as to stop against the pulleys 13, that the shoulders 43 of shaft 25 rest upon the bottoms of the slots 5. This has the effect of removing the weight of the parts on the axle 25 from the hose 17 and from the strands 53, or, in the case of the construction of Figs. 7 and 8, from the pinions 65.

It is clear that, in any other position above wherein the axle 25 rests at the bottoms of the slots 5, the support for the reel parts R consists in the hose 17 in part, and the strands 53 in part (in the case of the first form of the invention); or (in the case of the second form of the invention) the support consists in the hose 17 in part and the racks 67 in part.

The present invention is advantageous over constructions wherein a weight is carried on the hose simply by depending the weight from a pulley block carried on a doubled-back hose. This is because in the suggested case the depth of chamber required for storing the hose is one-half of the total length of the hose. In the case of the present invention the depth of the total device is much less than one-half of the hose length.

It will be understood that the hose line may be wound upon its reel helically, that is, each circuit of the hose being next to the other, instead of laid over one another as in the case of the spiral winding shown but this procedure sacrifices some compactness of structure.

Inasmuch as the present reel is applicable to a wide variety of flexible objects, such as hoses, wires, belts, ropes, chains, cables and the like, the term flexible lines is used generically for such and similar objects.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A hose line retriever comprising a frame, a rotary and movable winding reel for spirally receiving a line, successive loops of the line in the spiral lying substantially in a single plane, means for raising the winding reel against gravity as the line is withdrawn from the winding element, said raising means being adapted to let the winding reel descend under gravity when the line is released and to cause said winding reel to rotate as it descends spirally to rewind said flexible line in said plane, whereby the leverage of the line effective to rotate the reel decreases continuously during unwinding.

2. A retriever for flexible hose lines and the like comprising spaced side members, a rotary reel located between the side members and formed per se to provide substantial gravitational weight and rotary inertia, said reel being adapted to enforce spiral winding of a line such that successive loops of the line in the spiral lie substantially in a plane, an axle attached to the reel, and supporting means attached to the axle comprising flexible members adapted to be wound on the axle and fastened to the side members respectively, said axle winding up on said flexible supporting members when the line is withdrawn from the reel and unwinding therefrom when the line is released to be retrieved by the resulting rotary descent of said reel, said side members having guide means for directing upward and downward movement of the reel.

3. A hose line retriever comprising a rotary axle, a reel on the axle including means for spirally winding a flexible line such that successive loops of the line lie substantially in a plane, means in conjunction with the line to support the axle and to be climbed by the axle as the line is unreeled and to permit rotary descent of the axle when the line is released to rewind said line, and a substantial weight which is rotary with the axle and furnishing substantial flywheel effect.

FOSTER HOLMES.
VICTOR G. KLEIN.